United States Patent [19]

Ward

[11] Patent Number: 4,931,800
[45] Date of Patent: Jun. 5, 1990

[54] STAGGER COMPENSATED MOVING TARGET DETECTOR

[75] Inventor: Harold R. Ward, Bedford, Mass.

[73] Assignee: Raytheon Company, Lexington, Mass.

[21] Appl. No.: 351,004

[22] Filed: May 12, 1989

[51] Int. Cl.⁵ .......................................... G01S 13/526
[52] U.S. Cl. ..................................... 342/162; 342/82; 342/194; 342/165
[58] Field of Search .............................. 342/161–165, 342/173, 174, 82, 83, 137, 194

[56] References Cited

U.S. PATENT DOCUMENTS

| | | | |
|---|---|---|---|
| 4,137,532 | 1/1979 | Taylor, Jr. et al. | 342/93 |
| 4,137,533 | 1/1979 | Briechle et al. | 342/162 |
| 4,173,017 | 10/1979 | Burlage et al. | 342/162 |
| 4,542,382 | 9/1985 | Hengelo | 242/91 |
| 4,577,192 | 3/1986 | Wiegand | 342/14 |
| 4,578,676 | 3/1986 | Harrison, Jr. | 342/89 |
| 4,591,857 | 5/1986 | Thor | 342/201 |
| 4,694,298 | 9/1987 | Milan | 342/89 |
| 4,714,927 | 12/1987 | Siegel et al. | 342/160 |
| 4,730,189 | 3/1988 | Siegel et al. | 342/104 |
| 4,742,353 | 5/1988 | D'Addio et al. | 342/159 |
| 4,783,660 | 11/1988 | Pierce | 342/101 |
| 4,809,002 | 2/1989 | Togashi et al. | 342/160 |
| 4,862,180 | 8/1989 | Martin | 342/417 |

Primary Examiner—Thomas H. Tarcza
Assistant Examiner—John B. Sotomayor
Attorney, Agent, or Firm—Walter F. Dawson; Richard M. Sharkansky

[57] ABSTRACT

A moving target detector (MTD) in a radar system uses corrected weighting coefficients to compensate for pulse stagger effect on transmitted pulses. Transmitted pulses are sampled when the radar is switched to a test mode for determining a correction factor which is used to calculate the corrected weighting coefficients. The radar return signals are processed in the MTD by a finite impulse response (FIR) filter using the stored corrected weighting coefficients calculated for each sequence of transmitted pulses including block stagger and pulse stagger sequences.

16 Claims, 3 Drawing Sheets

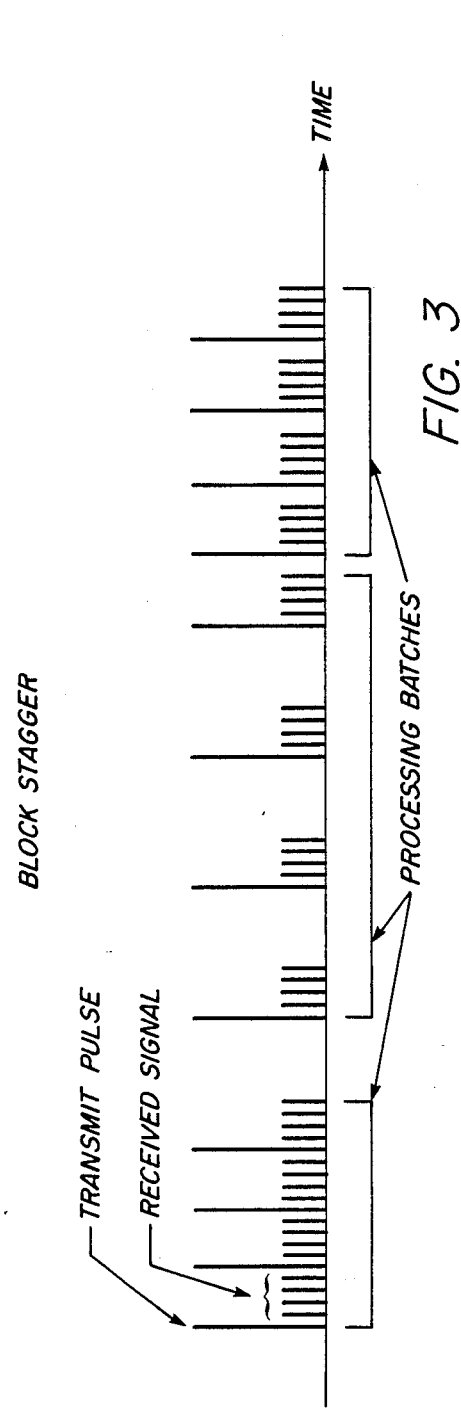

_STAGGER COMPENSATED MOVING TARGET DETECTOR_

BACKGROUND OF THE INVENTION

The present invention relates to a pulse-radar system having a staggered pulse repetition frequency, and more particularly to the compensation of stagger induced modulation in a transmitter RF output.

As is known in the art, when a staggered pulse repetition frequency (PRF) is used in a pulse-radar system, a voltage variation is induced in the transmitter power supply. Such a voltage variation modulates the amplitude and phase of the RF pulses. The filters of a moving target detector (MTD) in the radar system are designed to cancel clutter returns that do not contain this staggered modulation; hence, a limitation on clutter attenuation occurs as a result of such staggered induced modulation on the RF pulses.

Radar systems in the prior art have attempted to deal with the staggered modulation problem by increasing the size of the filter in the transmitter power supply or by discarding power to maintain a constant power supply load which can amount to approximately 20% lost power.

SUMMARY OF THE INVENTION

In accordance with the present invention a pulsed radar system having a staggered pulse repetition frequency (PRF) is provided with staggered compensation in a moving target detector. The radar system comprises means for transmitting pulses with a staggered pulse repetition frequency (PRF), means for receiving return signals from the transmitted pulses, means coupled to the transmitting means and the receiving means for switching to an operate mode or a test mode, means coupled to the switching means for sampling the transmitted pulses and coupling the sampled transmitted pulses to the receiving means when the radar system is switched to the test mode for determining corrected weighting coefficients, means coupled to the switching means for calculating the corrected weighting coefficients based on the quadrature samples of the sampled transmitted pulses and uncorrected coefficient inputs when the radar system is switched to the test mode, means coupled to an output of the coefficient calculating means for storing the corrected weighting coefficients, means coupled to the receiving means and the storing means for filtering quadrature samples of the received return signals of sequences of the transmitted pulses in accordance with the corrected weighting coefficients received from the storing means, and means coupled to the storing means and the transmitting means for synchronizing the corrected weighting coefficients for the filter means with the transmitted pulses. The transmitted pulses comprise two types of staggered PRF, block stagger and pulse stagger. The block stagger transmitted pulses comprise a plurality of stagger blocks wherein the interpulse periods are equal within each of the blocks of the transmitted pulses and the interpulse period may be the same or vary for each of the blocks. The pulse stagger transmitted pulses comprise a varying interpulse period from pulse to pulse.

In accordance with a further feature of the invention, a method of stagger compensation is provided in a moving target detector of a radar system comprising the steps of transmitting pulses with staggered pulse repetition frequency (PRF), receiving return signals from the transmitted pulses, switching to an operate mode or a test mode with means coupled to the transmitting means and the receiving means, sampling the transmitted pulses and coupling the sampled transmitted pulses to the receiving means when the radar system is switched to the test mode, calculating corrected weighting coefficients based on quadrature samples from the receiving means of the sampled transmitted pulses and uncorrected coefficient inputs when the radar system is switched to the test mode, storing the corrected weighting coefficients, filtering quadrature samples of the received return signals of sequences of the transmitted pulses from the receiving means in accordance with the corrected weighting coefficients received from the storing means, and synchronizing the corrected weighting coefficients for the filter means with the transmitted pulses. The method further comprises the step of transmitting pulses comprising a plurality of stagger blocks wherein the interpulse periods are equal within each of the blocks of the transmitted pulses, and the interpulse period may be the same or vary for each one of the blocks. In addition, an alternative step of transmitting pulses with said staggered PRF is provided having a varying interpulse period from pulse to pulse.

BRIEF DESCRIPTION OF THE DRAWINGS

Other and further features and advantages of the invention will become apparent in connection with the accompanying drawings wherein:

FIG. 3 shows an example of the relative timing of transmitter and receiver radar signals for block stagger for a four pulse FIR in pulse-radar systems.

FIG. 4 shows an example of the relative timing of transmitter and receiver radar signal for poise stagger receive radar signals for pulse stagger for a four pulse FIR in pulse-radar system.

DESCRIPTION OF THE PREFERRED EMBODIMENT

Figure 1:
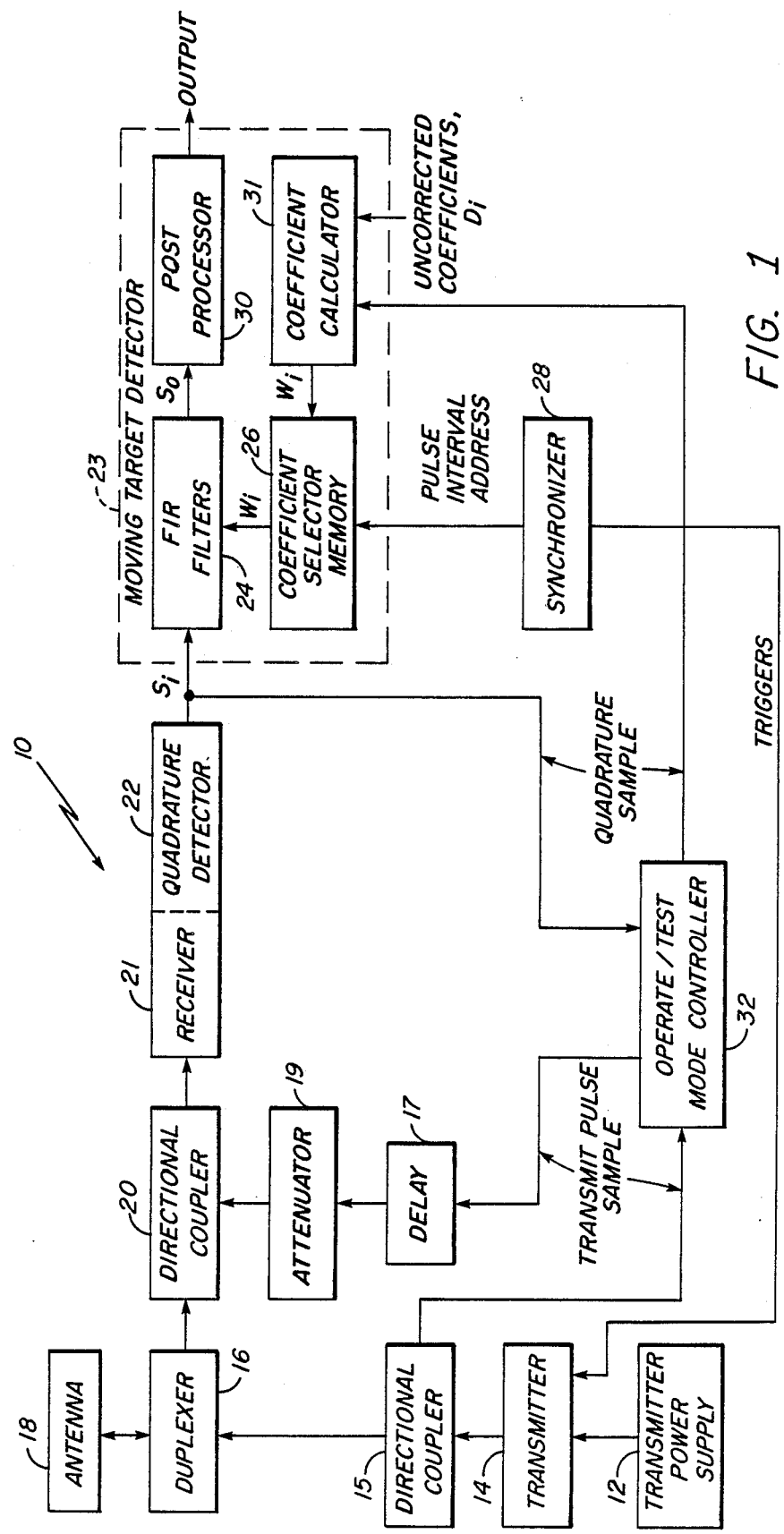
FIG. 1 is a block diagram of a radar system having staggered compensation in the moving target detector in accordance with the present invention.

Referring to FIG. 1 there is shown a block diagram of a pulse-radar system 10 having staggered compensation in a moving target detector 23 in accordance with the present invention. A transmitter 14 generates a staggered pulse sequence in accordance with trigger pulses from a synchronizer 28. Transmitter power supply 12 provides power to the transmitter 14. The transmitter output is coupled via a directional coupler 15 to a duplexer 16 which provides the transmitted pulses to an antenna 18. Return signals are picked up by the antenna 18 and coupled to a receiver 21 via duplexer 16 coupled to a directional coupler 20. The received return signals are amplified and passed on to a quadrature detector 22 comprising phase detectors and analog-to-digital converters known to one skilled in the art for collecting quadrature data samples of the received return signals. The quadrature data samples are coupled to the moving target detector (MTD) 23 comprising finite impulse response (FIR) filters 24 coupled to a post processor 30 which is required for further radar signal processing. The error due to power supply 12 modulation on the received signals being processed by the FIR filters 24 is compensated by corrected weighting coefficients stored in a digital coefficient selector memory 26, the output of which is coupled to the FIR filters 24. The selection of the corrected weighting coefficients in the digital memory 26 is determined by a pulse interval address generated by synchronizer 28 which generates the transmitter trigger signals. The MTD 23 also comprises a coefficient calculator which is coupled to the coefficient selector memory 26. When the radar system 10 is switched from an operate mode to a test mode by an operate/test mode controller 32, the coefficient calculator determines corrected weighting coefficients ($W_i$) based on samples of transmitted signals and uncorrected filter coefficients ($D_i$), and the calculated corrected weighting coefficients are stored in the coefficient selector memory 26.

Figure 2:
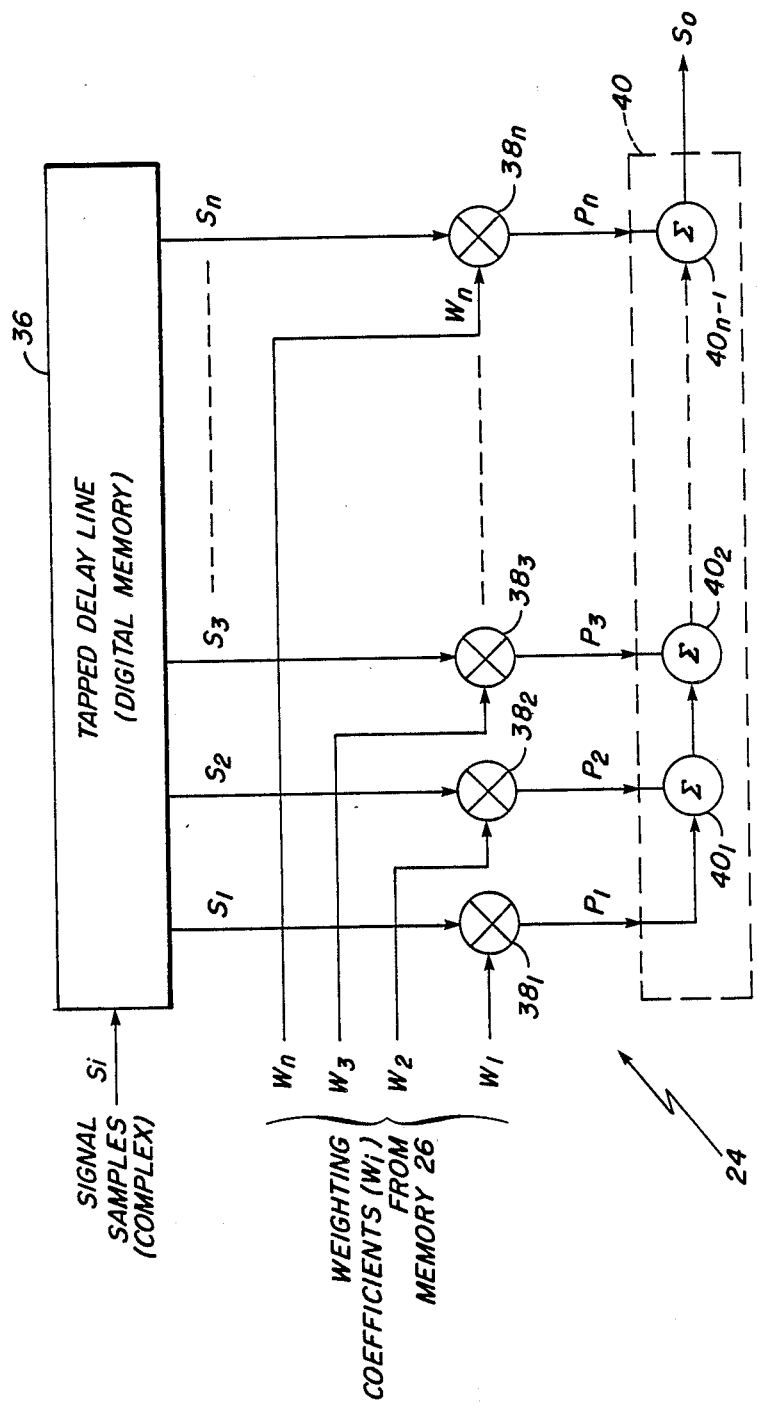
FIG. 2 is a functional block diagram of an FIR filter showing the $W_i$ inputs for the filter weighting coefficients.

Referring to FIG. 2, a functional representation of each of the FIR filters 24 is shown. All of the complex signal samples ($S_i$) which are the radar returns from a number of transmitted pulses, n, are stored in a digital memory for processing after all of the return signals have been received; this memory is represented functionally by a tapped delay line 36. Selected return signal samples (those from the same target range) are retrieved from memory delay line 36) and multiplied by a corresponding corrected weighting coefficient ($W_i$) in multipliers $38_l$ to $38_n$. These weighting coefficients have been stored in the digital coefficient selector memory 26, and a particular set of coefficients is selected by a pulse interval address provided by synchronizer 28 for the interpulse periods that were used when collecting the signal samples. The complex outputs ($P_l$ to $P_n$) from the multipliers $38_l$ to $38_n$ are added together by a plurality of summers $40_l$ to $40_{n-1}$ to produce the complex filter output, $S_o$.

The complex multiplier is represented mathematically as follows:

If the received signals, $S = Sx + jSy$ and the filter weight, $W = Wx + jWy$ $$then, S * W = (Sx + jSy) * (Wx + jWy)$$

$$S * W = (SxWx - SyWy) + j(SxWy + SyWx)$$

Hence, a single complex multiply requires four numbers as inputs to each of the multipliers $38_l$ to $38_n$ and two numbers are generated at the outputs $P_l$ to $P_n$. The complex filter output, $S_o$, may be expressed as follows:

$$S_o = \sum_{i=1}^{n} S_i^* W_i$$

Referring to FIG. 1, the uncorrected filter coefficients ($D_i$) used for a particular group of pulses are corrected by the coefficient calculator 31 to compensate for the small amplitude and phase errors on the transmitted signal resulting from the staggered PRF using the following formula:

$$W_i = D_i^*(T_l/T_i)$$

where $D_i$ are the uncorrected complex filter coefficients, $T_l$ is is the first complex transmitter output pulse sample in the group, $T_i$ is the i th complex transmitter pulse sample in the group and $W_i$ are the compensated or corrected filter weights. These transmitter output pulses are measured periodically (depending on the system application and the method of staggered PRF) by the operate/test mode controller 32 switching the radar system 10 to the test mode of operation and they are used to compute the new corrected weighting coefficients, ($W_i$), which are stored in memory 26 for use in the normal operate mode of the radar.

An example showing a particular set of numerical values for the uncorrected weights, transmitter samples, and corrected weights is shown in Table 1. The values are chosen arbitrarily to illustrate the process. When any uncorrected weighting coefficient ($W_i$) is multiplied by its corresponding transmitter sample ($S_i$) the result is equal to $S_l$, thus proving that the weighting coefficients remove the signal distortion injected by the transmitter.

TABLE 1

| Uncorrected filter coefficient weights: | | |
|---|---|---|
| | Dx1 = 1.00 | Dy1 = 0.00 |
| | Dx2 = 1.00 | Dy2 = 0.00 |
| | Dx3 = 1.00 | Dy3 = 0.00 |
| | Dx4 = 1.00 | Dy4 = 0.00 |
| Transmitter samples: | Tx1 = 1.01 | Ty1 = 0.10 |
| | Tx2 = 1.00 | Ty2 = 0.00 |
| | Tx3 = 0.98 | Ty3 = 0.10 |
| | Tx4 = 0.90 | Ty4 = 0.20 |
| Corrected filter coefficient weights: | Wx1 = 1.00 | Wy1 = 0.00 |
| | Wx2 = 1.01 | Wy2 = 0.10 |
| | Wx3 = 1.03 | Wy3 = −0.003 |
| | Wx4 = 1.09 | Wy4 = −0.13 |

Referring again to FIG. 1, the radar system 10 is placed in a test mode by the operate/test mode controller 32, to measure the transmitter output samples ($T_l$ to $T_i$) for each transmitted pulse, and these measurements are used to compute the corrected filter weights ($W_i$) in the coefficient calculator 31 which are (as described above) used by the FIR filters 24 in the normal operate mode. In the test mode a sample of the transmit pulse is coupled from the output of transmitter 14 via the operate/test mode controller to a time delay 17 and attenuator 19 and then coupled to the receiver 21 input via directional coupler 20. The transmitter samples are amplified and quadrature detected in receiver 21 and quadrature detector 22 which is the same apparatus used in the radar system operate mode. When in the test mode, the quadrature detector 22 output is switched to the coefficient calculator 31 by the operate/test mode controller 32 for calculating the new corrected filter coefficient weights ($W_i$).

Referring now to FIG. 3 and FIG. 4, there are two methods illustrated for accomplishing the stagger compensated MTD. PRF stagger may be applied either as block stagger as shown in FIG. 3 or pulse stagger as shown in FIG. 4. In the block stagger method a block of pulses are transmitted with equal interpulse intervals. The signals received from this block of transmissions are stored and processed as a single batch. The interpulse spacing varies from block to block but the processing remains the same with the exception of the corrections placed on the filter weights. Each processing batch uses its own set of corrected weights for processing the signals in that batch. These corrected weights will cancel the transmitter modulation induced on the transmitter output by the power supply's response to the particular interpulse periods used.

The second method referred to as pulse stagger employs pulse-to-pulse stagger. Here the interval between pulses is not held fixed as it was in block stagger but rather the interpulse interval varies from pulse to pulse. Four contiguous pulses comprise a processing batch as shown in the example of FIG. 4. After the next pulse is transmitted and its signal returns are received and stored, another processing batch is initiated. This new batch combines the returns from the last four transmitted pulses, and since the pulses have different relative positions in time, that processing batch requires a different set of corrected weights from the preceding batch. Therefore, in the pulse stagger method a new set of corrected filter weights is obtained from the digital coefficient selector memory 26 at the start of each processing batch.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. A radar system having stagger compensation in a moving target detector comprising:
    means for transmitting pulses with staggered pulse repetition frequency (PRF);
    means for receiving return signals from said transmitted pulses;
    means for storing in said moving target detector predetermined weighting coefficients corrected for pulse stagger amplitude and phase errors on said transmitted pulses, said predetermined corrected weighting coefficients being determined during a test mode of said radar system;
    means coupled to said receiving means and said storing means for filtering quadrature samples of said received return signals of sequences of said transmitted pulses in accordance with said corrected weighting coefficients received from said storing means; and
    means coupled to said storing means and said transmitting means for synchronizing said corrected weighting coefficients for said filter means with said transmitted pulses.

2. The radar system as recited in claim 1 wherein:
    said transmitted pulses comprises a plurality of stagger blocks wherein said interpulse periods are equal within each of said blocks of said transmitted pulses and said interpulse period may vary from block to block.

3. The radar system as recited in claim 1 wherein:
    said transmitted pulses with staggered PRF comprises a varying interpulse period from pulse to pulse.

4. A radar system having stagger compensation in a moving target detector comprising:
    means for transmitting pulses with staggered pulse repetition frequency (PRF);
    means for receiving return signals from said transmitted pulses;
    means coupled to said transmitting means and said receiving means for switching to an operate mode or a test mode, said test mode providing sampling of said transmitted pulses and a quadrature output of said receiving means;
    means coupled to said switching means for sampling said transmitted pulses and coupling said sampled transmitted pulses to said receiving means when said radar system is switched to said test mode for determining corrected weighting coefficients;
    means coupled to said switching means for calculating said corrected weighting coefficients based on said quadrature samples of said sampled transmitted pulses and uncorrected coefficient inputs when said radar system is switched to said test mode;
    means coupled to an output of said coefficient calculating means for storing said corrected weighting coefficients;
    means coupled to said receiving means and said storing means for filtering quadrature samples of said received return signals of sequences of said transmitted pulses in accordance with said corrected weighting coefficients received from said storing means; and
    means coupled to said storing means and said transmitting means for synchronizing said corrected weighting coefficients for said filter means with said transmitted pulses.

5. The radar system as recited in claim 4 wherein:
    said transmitted pulses comprises a plurality of stagger blocks wherein said interpulse periods are equal within each of said blocks of said transmitted pulses and said interpulse period may vary from block to block.

6. The radar system as recited in claim 4 wherein:
    said transmitted pulses with staggered PRF comprises a varying interpulse period from pulse to pulse.

7. The radar system as recited in claim 4 wherein said switching means comprises:
    first switch means arranged to couple said pulses from said transmitting means to delay and attenuator means when set to said test mode; and
    second switch means arranged to couple said quadrature samples of said pulses from said transmitting means to said coefficient calculator when set to said test mode.

8. The radar system as recited in claim 4 wherein:
    said means for sampling said transmitted pulses in said test mode comprises delay and attenuator means for providing signals to said receiving means having characteristics of said return signals.

9. A method for providing stagger compensation in a moving target detector of a radar system comprising the steps of:
    transmitting pulses with staggered pulse repetition frequency (PRF);
    receiving return signals from said transmitted pulses;
    storing in said moving target detector predetermined weighting coefficients corrected for pulse stagger amplitude and phase errors on said transmitted pulses, said predetermined corrected weighting coefficients being determined during a test mode of said radar system;
    filtering quadrature samples of said received return signals of sequences of said transmitted pulses from said receiving means in accordance with said corrected weighting coefficients received from said storing means; and
    synchronizing said corrected weighting coefficients for said filter means with said transmitted pulses.

10. The method as recited in claim 9 wherein:
    said method further comprises the step of transmitting pulses comprising a plurality of stagger blocks wherein said interpulse periods are equal within each of said blocks of said transmitted pulses, and said interpulse period may vary from block to block.

11. The method as recited in claim 9 wherein:
said method further comprises the step of transmitting stagger pulses with said staggered PRF having a varying interpulse period from pulse to pulse.

12. A method for providing stagger compensation in a moving target detector of a radar system comprising the steps of:
transmitting pulses with staggered pulse repetition frequency (PRF);
receiving return signals from said transmitted pulses;
switching to an operate mode or a test mode with means coupled to said transmitting means and said receiving means;
sampling said transmitted pulses and coupling said sampled transmitted pulses to said receiving means when said radar system is switched to said test mode;
calculating corrected weighting coefficients based on quadrature samples from said receiving means of said sampled transmitted pulses and uncorrected coefficient inputs when said radar system is switched to said test mode;
storing in said moving target detector said corrected weighting coefficients corrected for amplitude and phase errors on said transmitted pulses;
filtering quadrature samples of said received return signals of sequences of said transmitted pulses from said receiving means in accordance with said corrected weighting coefficients received from said storing means; and
synchronizing said corrected weighting coefficients for said filter means with said transmitted pulses.

13. The method as recited in claim 12 wherein:
said method further comprises the step of transmitting pulses comprising a plurality of stagger blocks wherein said interpulse periods are equal within each of said blocks of said transmitted pulses, and said interpulse period may vary from block to block.

14. The method as recited in claim 13 wherein:
said step of calculating corrected weighting coefficients for return signal processing is performed for each of said blocks.

15. The method as recited in claim 12 wherein:
said method further comprises the step of transmitting stagger pulses with said staggered PRF having a varying interpulse period from pulse to pulse.

16. The method as recited in claim 15 wherein:
said step of calculating corrected weighting coefficients for return signal processing is performed for each predetermined batch of said staggered pulse return signals.

* * * * *